United States Patent
Chung et al.

(10) Patent No.: US 9,829,057 B2
(45) Date of Patent: Nov. 28, 2017

(54) DRUM IN HAT BRAKE DISK FOR VEHICLE AND MANUFACTURING METHOD THEREOF

(71) Applicant: Hyundai Motor Company, Seoul (KR)

(72) Inventors: Min Gyun Chung, Seongnam-si (KR); Yoon Cheol Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/932,694

(22) Filed: Nov. 4, 2015

(65) Prior Publication Data

US 2016/0369857 A1 Dec. 22, 2016

(30) Foreign Application Priority Data

Jun. 16, 2015 (KR) .......................... 10-2015-0085414

(51) Int. Cl.
| | |
|---|---|
| *F16D 65/12* | (2006.01) |
| *C23C 4/06* | (2016.01) |
| *C22C 21/02* | (2006.01) |
| *C22C 38/04* | (2006.01) |
| *C23C 4/129* | (2016.01) |

(Continued)

(52) U.S. Cl.
CPC ............ *F16D 65/127* (2013.01); *C22C 21/02* (2013.01); *C22C 38/04* (2013.01); *C23C 4/06* (2013.01); *C23C 4/129* (2016.01); *C23C 4/18* (2013.01); *F16D 65/123* (2013.01); *F16D 2065/1344* (2013.01)

(58) Field of Classification Search
CPC ....... F16D 65/12; F16D 65/128; C22C 21/00; C22C 21/003; C22C 21/02; C22C 21/06; C22C 21/08; C22C 21/10
USPC .................... 188/218 XL, 17, 18 A
See application file for complete search history.

(56) References Cited

U.S. PATENT DOCUMENTS

| | | | | |
|---|---|---|---|---|
| 5,407,035 A | * | 4/1995 | Cole | .......................... C23C 4/18 188/218 XL |
| 6,136,374 A | * | 10/2000 | Reuscher | ............... B05D 1/002 188/218 XL |

(Continued)

FOREIGN PATENT DOCUMENTS

| | | |
|---|---|---|
| JP | H07-019268 A | 1/1995 |
| JP | 2011112211 | 6/2011 |

(Continued)

*Primary Examiner* — Robert A Siconolfi
*Assistant Examiner* — San Aung
(74) *Attorney, Agent, or Firm* — Brinks Gilson & Lione

(57) ABSTRACT

A drum in hat brake disc that includes a main braking part and a hat part coupled to the main braking part with a sprayed coating layer formed on a frictional surface of therein. And a manufacturing method includes the steps of casting a main braking part and seating the main braking part in a mold and injecting an aluminum alloy melt into the mold to form a hat part. The method also includes the steps of cooling the main braking part and the hat part and separating the mold to manufacture the drum in hat brake disk. The method includes polishing a surface of an inner diameter part of the hat part and performing a short blast process of the surface using alumina. The method also includes forming a sprayed coating layer on the inner diameter part subjected to the short blast process.

11 Claims, 3 Drawing Sheets

(51) Int. Cl.
*C23C 4/18* (2006.01)
*F16D 65/02* (2006.01)

(56) References Cited

U.S. PATENT DOCUMENTS

| | | | | |
|---|---|---|---|---|
| 6,321,885 | B1 * | 11/2001 | Wendt | B22D 19/16 |
| | | | | 188/218 XL |
| 6,409,966 | B1 * | 6/2002 | Sircar | C22C 21/003 |
| | | | | 420/530 |
| 7,255,756 | B2 * | 8/2007 | Tsao | C22C 21/02 |
| | | | | 148/415 |
| 7,967,115 | B2 * | 6/2011 | Keller | F16D 65/12 |
| | | | | 188/218 XL |
| 8,657,082 | B2 | 2/2014 | Lembach et al. | |
| 2003/0097754 | A1 * | 5/2003 | Yamane | B05D 7/14 |
| | | | | 29/898 |
| 2003/0159893 | A1 * | 8/2003 | Tironi | B22D 11/0405 |
| | | | | 188/71.1 |
| 2004/0031652 | A1 * | 2/2004 | Khambekar | F16D 65/127 |
| | | | | 188/218 XL |
| 2006/0057387 | A1 * | 3/2006 | Magario | B82Y 30/00 |
| | | | | 428/408 |
| 2007/0246314 | A1 * | 10/2007 | Schorn | F16D 65/12 |
| | | | | 188/218 XL |
| 2009/0026025 | A1 * | 1/2009 | Hampton | F16D 65/127 |
| | | | | 188/218 XL |
| 2009/0317642 | A1 * | 12/2009 | Goller | C04B 35/565 |
| | | | | 428/450 |
| 2012/0058363 | A1 | 3/2012 | Verpoort et al. | |
| 2012/0186919 | A1 * | 7/2012 | Hanna | F16D 65/12 |
| | | | | 188/218 XL |
| 2013/0146405 | A1 * | 6/2013 | Kim | C22C 21/08 |
| | | | | 188/218 XL |
| 2013/0161136 | A1 | 6/2013 | Huschenhoefer et al. | |
| 2013/0295375 | A1 * | 11/2013 | Ernst | C23C 4/06 |
| | | | | 428/332 |

FOREIGN PATENT DOCUMENTS

| | | |
|---|---|---|
| KR | 20100018306 | 2/2010 |
| KR | 10-2011-0034849 A | 4/2011 |
| KR | 10-2013-0017376 A | 2/2013 |
| KR | 10-2013-0115115 A | 10/2013 |

* cited by examiner

DRUM IN HAT BRAKE DISK FOR VEHICLE AND MANUFACTURING METHOD THEREOF

CROSS REFERENCE TO RELATED APPLICATION

This application claims the benefit of Korean Patent Application No. 10-2015-0085414, filed on Jun. 16, 2015, which is hereby incorporated by reference in its entirety.

FIELD

The present disclosure relates to a drum in hat brake disk and a manufacturing method thereof.

BACKGROUND

The statements in this section merely provide background information related to the present disclosure and may not constitute prior art.

In general, a brake system used for a vehicle is classified into a foot brake system in which a driver presses his or her foot down on a pedal to provide braking force to a vehicle while driving the vehicle, and a parking brake system in which the driver manipulates a lever, or the like at the time of parking or stopping the vehicle to brake the vehicle so that the vehicle is not moved due to external impact or a self load on a slope road, depending on a function of the brake system.

The brake system used for the vehicle may be classified into a disk brake system and a drum brake system, depending on an operation method of the brake system.

Among these, the disk brake system has a structure in which pads provided on both sides of a disk rotated together with a wheel brake the disk by compressing the disk, and is mainly mounted in the front wheels of the vehicle, and the drum brake system has a structure in which a pair of brake shoes provided in a drum rotated together with the wheel are expanded to brake the drum, and is mainly mounted in the rear wheels.

Here, the drum brake system mounted in the rear wheels serves as the parking brake as well as a main brake.

More specifically, the drum brake system is connected to a parking brake lever provided in an interior of the vehicle by a cable. Thus, when a user manipulates the parking brake lever, the brake shoes pulled by the cable are closely adhered to the brake drum, thereby generating the braking force. Recently, not the drum brake, but the disk brake has also been used for the rear wheels of the vehicle. As such, in the case in which the disk brake is used for the rear wheels, the parking brake is provided independent of the disk brake, which is implemented as a drum in hat (DIH) brake system. The drum in hat brake system has the drum brake system provided in the disk brake system, and the general drum in hat brake system according to the related art is specifically disclosed in the prior art.

An inner diameter part of a hat part provided in a main braking part of the drum in hat brake system as described in the related prior art, which is a portion from which mechanical friction with a friction material is generated, should easily discharge frictional heat and have superior durability. Conventionally, the above-mentioned hat part has mainly used gray cast iron having good heat resistance and wear resistance.

However, the gray cast iron, which is cast iron obtained by educing flake graphite, has good mechanical strength and good corrosion resistance and vibration absorptivity, and the like, while specific gravity thereof is 7.2 $g/cm^3$, which is quite heavy. Thus, the gray cast iron may degrade riding quality, manipulability, and fuel efficiency of the vehicle.

In addition, due to recent issues of exhaustion of oil energy, climate change, and the like, the technology development for improving fuel efficiency is increasing in the global vehicle industry.

SUMMARY

The present disclosure provides a drum in hat (DIH) brake system capable of improving braking force of a vehicle while reducing an increase in weight of the vehicle so as to improve riding quality, manipulability, and fuel efficiency of the vehicle, and a manufacturing method thereof.

In addition, the present disclosure provides a DIH brake system capable of improving wear resistance of an inner diameter part of a hat part from which friction with a friction material is generated, and a manufacturing method thereof.

According to one form of the present disclosure, there is provided a manufacturing method of a drum in hat brake disk, including: a main braking part casting operation of casting cast iron to prepare a main braking part; a hat part casting operation of seating the main braking part in a mold and injecting an aluminum alloy melt into the mold to form a hat part; a mold separating operation of cooling the main braking part and the hat part at room temperature and separating the mold to manufacture the drum in hat (DIH) brake disk; a first surface treatment operation of polishing a surface of an inner diameter part of the hat part in order to improve adhesion of a sprayed coating layer; a second surface treatment operation of performing a short blast process for the surface of the inner diameter part of the hat part using alumina; and a spray coating operation of forming the sprayed coating layer on the inner diameter part of the hat part which is subjected to the short blast process.

The manufacturing method may further include, after the main braking part casting operation, a main braking part pre-heating operation of pre-heating the main braking part to 400 to 500° C. in order to improve flowability and filling properties of the aluminum alloy melt.

In the first surface treatment operation, the inner diameter part of the hat part may be grinded to have surface roughness Ra of 1.0 to 2.0 μm.

In the second surface treatment operation, the inner diameter part of the hat part may be subjected to the short blast process to have surface roughness Ra of 5.0 to 8.0 μm.

In the spray coating operation, the sprayed coating layer may be formed of high carbon steel wire rod (SWRH) iron (Fe) wire using a flame wire spray method.

In the spray coating operation, the sprayed coating layer may be formed at a speed of 10 to 25 μm/pass, and the sprayed coating layer may contain carbon (C) of 0.44 to 0.51 wt %, silicon (Si) of 0.15 to 0.35 wt %, manganese (Mn) of 0.60 to 0.90 wt %, phosphorus (P) of 0.04 wt % or less (but, except for 0 wt %), sulfur (S) of 0.04 wt % or less, the remainder iron (Fe), and incidental impurities.

The manufacturing method may further include, after the spray coating operation, a sprayed coating layer polishing operation of polishing the sprayed coating layer so that a thickness of the sprayed coating layer is 100 to 150 μm, and surface roughness of the sprayed coating layer is 0.8 to 1.8 μm.

The aluminum alloy melt may contain silicon (Si) of 11 to 13 wt %, copper (Cu) of 3 to 5 wt %, nickel (Ni) of 2 to 4 wt %, the remainder aluminum (Al), and incidental impurities.

According to another form of the present disclosure, there is provided a drum in hat (DIH) brake system for a vehicle, including: a main braking part made of a cast iron material; and a hat part coupled to the main braking part to be rotated together with wheels of the vehicle and having a sprayed coating layer formed on a frictional surface therein.

The hat part may be formed of an aluminum alloy containing silicon (Si) of 11 to 13 wt %, copper (Cu) of 3 to 5 wt %, nickel (Ni) of 2 to 4 wt %, the remainder aluminum (Al), and incidental impurities.

The sprayed coating layer may contain carbon (C) of 0.44 to 0.51 wt %, silicon (Si) of 0.15 to 0.35 wt %, manganese (Mn) of 0.60 to 0.90 wt %, phosphorus (P) of 0.04 wt % or less (but, except for 0 wt %), sulfur (S) of 0.04 wt % or less, the remainder iron (Fe), and incidental impurities.

A thickness of the sprayed coating layer may be 100 to 150 μm and surface roughness of the sprayed coating layer may be 0.8 to 1.8 μm.

The sprayed coating layer may be a Fe based flame sprayed coating layer, and hardness $H_v$ of the sprayed coating layer may be 300 to 400.

Tensile strength of the main braking part may be 170 Mpa or more, and tensile strength of the hat part may be 100 Mpa or more.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
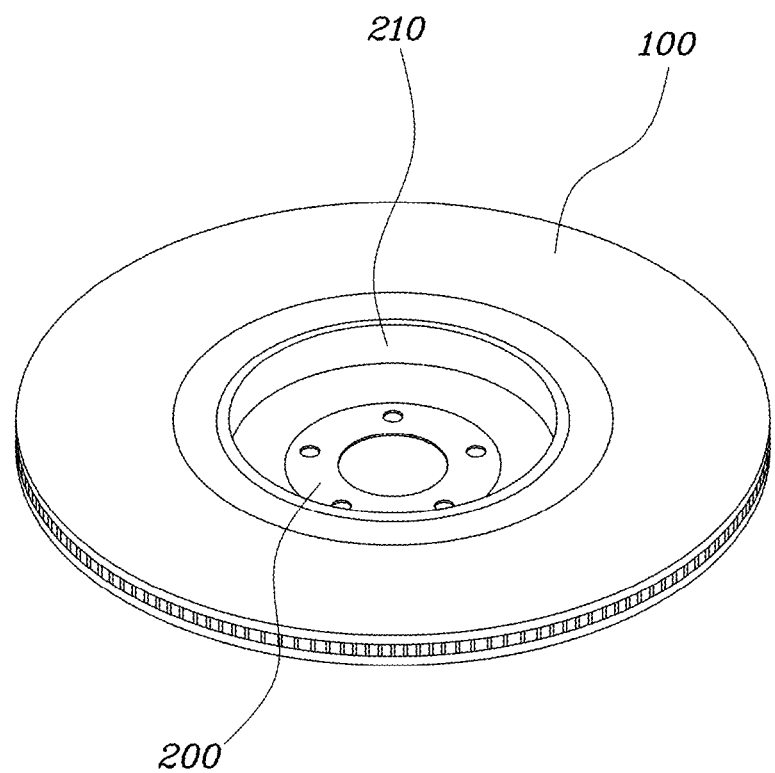
FIG. 1 is a perspective view showing a general drum in hat brake disk.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a drum in hat brake disk which is generally used for a vehicle includes a main braking part 100 and a hat part 200. Particularly, an inner diameter part 210 of the hat part 200 from which mechanical friction with a friction material (lining) is generated should have good wear resistance.

In a manufacturing method of a drum in hat brake disk according to one form of the present disclosure, the main braking part 100 is manufactured of gray cast iron and the hat part 200 is manufactured of an aluminum alloy so as to reduce weight of a vehicle. Here, in order to supplement the wear resistance of aluminum, the wear resistance of the hat part 200 is improved by forming a sprayed coating layer in the inner diameter part 210 of the hat part 200.

Figure 2:
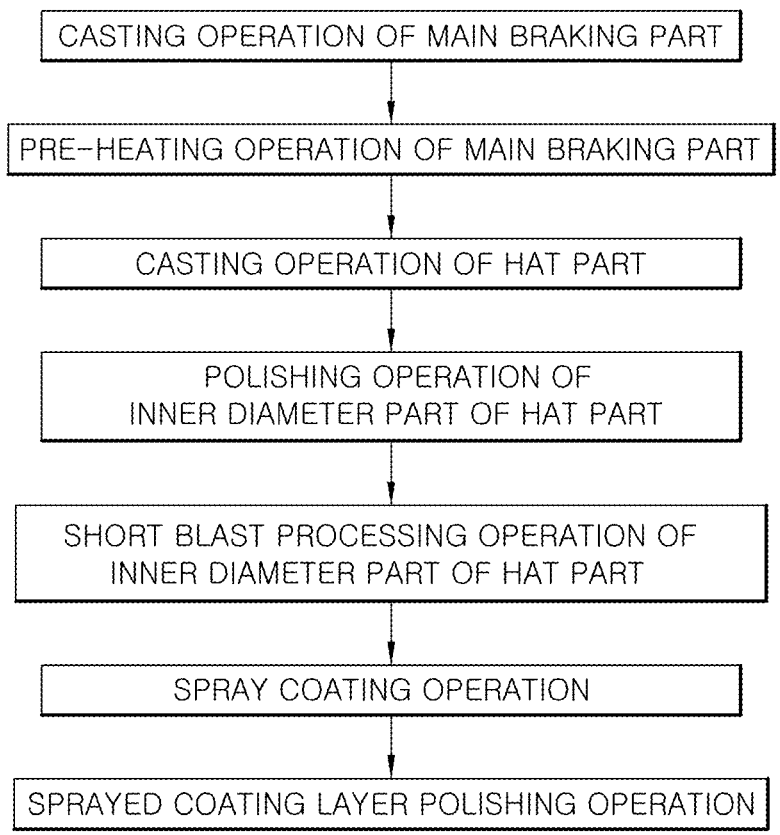
FIG. 2 is a flow chart of a manufacturing method of a drum in hat brake disk according to one form of the present disclosure.

FIG. 2 is a flow chart of a manufacturing method of a drum in hat brake disk according to one form of the present disclosure.

As shown in FIG. 2, the manufacturing method of a drum in hat brake disk according to one form of the present disclosure includes a casting operation of a main braking part 100, a casting operation of a hat part 200, a separating operation of a mold, first and second surface treatment operations, and a spray coating operation.

In the casting operation of the main braking part 100, the main braking part 100 is manufactured by casting gray cast iron having good static frictional coefficient and kinetic frictional coefficient and good heat resistance and wear resistance. The main braking part 100 may be manufactured by a gravity casting, a differential pressure casting, a low pressure casting, a vacuum and suction casting, a die casting, or a squeeze casting, and it is also possible to use a sand casting.

In this case, the main braking part 100 may be formed to have tensile strength of 170 MPz or more and may further include a plurality of coupling protrusions which are radially formed on an inner circumference surface to which the hat part 200 is coupled, so as to reinforce coupling force with the hat part 200.

In the case in which the main braking part 100 is prepared, in the casting operation of the hat part 200, the main braking part 100 is positioned in a mold which is manufactured in advance and the hat part 200 is casted.

The hat part 200 may also be manufactured by various castings similar to the main braking part 100, and may be manufactured by the gravity casting or the low pressure casting.

In this case, the hat part 200 may be formed using an aluminum alloy. More specifically, an aluminum alloy melt used at the time of casting the hat part 200 contains silicon (Si) of 11 to 13 wt %, copper (Cu) of 3 to 5 wt %, nickel (Ni) of 2 to 4 wt %, the remainder aluminum (Al), and incidental impurities.

Thus, the hat part 200 is manufactured of the aluminum alloy instead of the conventional gray cast iron of higher weight, such that the vehicle is lightened, thereby making it possible to improve fuel efficiency and driving manipulability.

Silicon (Si) serves to improve wear resistance and mechanical properties of the aluminum alloy during a solidification process of an alloy and to improve flowability of the aluminum alloy melt. In the case in which a content of silicon (Si) is less than 11 wt %, the strength of the alloy is decreased, and in the case in which the content of silicon (Si) exceeds 13 wt %, the strength thereof is improved, but an elongation rate is decreased, by which brittleness is increased. Therefore, the content of silicon (Si) may be limited to the range of 11 to 13 wt %.

Meanwhile, copper (Cu) improves corrosion resistance and mechanical properties of the aluminum alloy by causing a strengthening effect. In the case in which a content of copper (Cu) is less than 3 wt %, since the strengthening effect is not sufficient, corrosion resistance and mechanical properties of the aluminum alloy is not sufficiently improved, and in the case in which the content of copper (Cu) exceeds 5 wt %, castability of the alloy is decreased. Therefore, the content of copper (Cu) may be limited to the range of 3 to 5 wt %.

In addition, nickel (Ni) is an element serving to improve high temperature properties and castability of the aluminum alloy by forming an intermetallic compound with aluminum. In the case in which a content of nickel is less than 2 wt %, since the intermetallic compound such as Al3Ni is generated less, the high temperature property and castability of the aluminum alloy may not be sufficiently secured, and in the case in which the content of nickel exceeds 4 wt %, since the intermetallic compound becomes coarse, brittleness of the aluminum alloy may be increased. Therefore, the content of nickel (Ni) may be limited to the range of 2 to 4 wt %.

Meanwhile, the manufacturing method of a drum in hat brake disk according to a form of the present disclosure may further include a pre-heating operation of the main braking part 100 pre-heating the main braking part 100 made of cast iron, between the casting operation of the main braking part 100 and the casting operation of the hat part 200.

As a result, flowability and filling property of the aluminum alloy melt forming the hat part 200 may be improved.

In this case, the main braking part 100 may be pre-heated to 400 to 500° C. The reason is that in the case in which the main braking part 100 is pre-heated to a temperature which is less than 400° C., it is difficult to sufficiently secure flowability and filling property of the aluminum alloy melt, and in the case in which the main braking part 100 is pre-heated to a temperature exceeding 500° C., it may cause deformation of the main braking part 100. Therefore, the pre-heating temperature of the main braking part 100 may be limited to the range of 400 to 500° C.

If an injection of the aluminum alloy melt is completed, in the separating operation of the mold, the aluminum alloy melt injected into the mold is cooled at room temperature and is then separated from the mold, thereby manufacturing the drum in hat brake disk.

As described above, if the drum in hat brake disk is formed, the first surface treating operation of polishing a surface of the inner diameter 210 of the hat part 200 is performed.

In this case, the first surface treatment operation is performed in a sequence of a rough grinding process and turning process by removing a honing process from a polishing process consisting of the rough grinding, the turning process (finishing process), and the honing process (grinding process). The inner diameter part 210 is preferably polished to have surface roughness of 1.0 to 2.0 μm. The reason is that a surface state of the inner diameter part 210 is changed due to a short blast process performed to enforce adhesion of the sprayed coating layer in the following second surface treatment process.

In the case in which the first surface treatment process as described above is completed, in the second surface treatment process, an inner surface part and a side surface part of the main braking part 100 on which the sprayed coating layer is not formed are masked and is then subjected to the short blast process using alumina powder, or the like, thereby increasing an adhesion area of the sprayed coating layer to improve adhesion.

In this case, the inner diameter part 210 is subjected to the short blast process to have the surface roughness of 5.0 to 8.0 μm. The reason is that in the case in which the surface roughness of the inner diameter part 210 is less than 5.0 μm, the adhesion of the sprayed coating layer may be decreased, and in the case in which the surface roughness of the inner diameter part 210 exceeds 8.0 μm, surface defect of the sprayed coating layer may be caused.

In the case in which the first and second surface treatment operations are completed, in the spray coating operation, the sprayed coating layer is formed on the inner diameter part 210 of the hat part 200.

The sprayed coating layer is formed in a manner that high carbon steel wire rod (SWRH) having a carbon content of 0.44 wt % or more is formed by a flame wire spray method, and contains carbon (C) of 0.44 to 0.51 wt %, silicon (Si) of 0.15 to 0.35 wt %, manganese (Mn) of 0.60 to 0.90 wt %, phosphorus (P) of 0.04 wt % or less (but, except for 0 wt %), sulfur (S) of 0.04 wt % or less, the remainder iron (Fe), and incidental impurities.

Here, in the case in which the carbon content of SWRH is less than 0.44 wt %, as tensile strength of the SWRH itself is decreased, hardness of the sprayed coating layer is decreased, and as a generated amount of graphite is decreased, heat dissipation characteristics and lubrication characteristics are decreased, thereby decreasing wear resistance. Therefore, in one form the sprayed coating layer is formed using the SWRH having the carbon content of 0.44 wt % or more.

Figure 3:
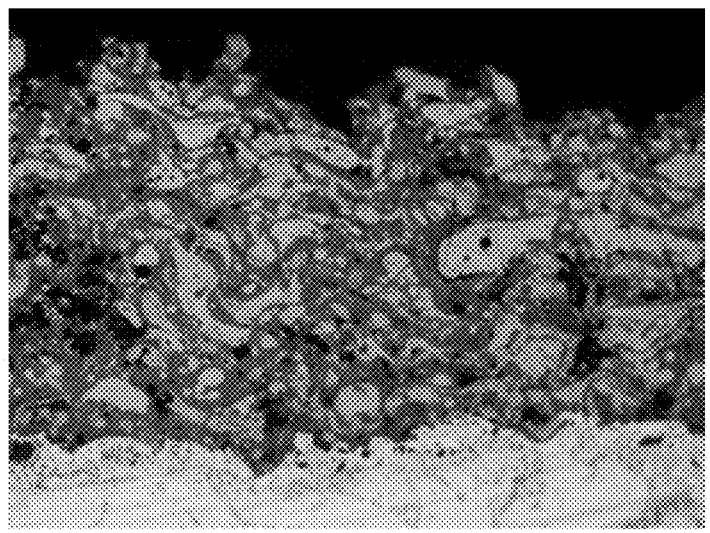
FIG. 3 is a view showing a sprayed coating layer formed by a flame wire spray.
Figure 4:
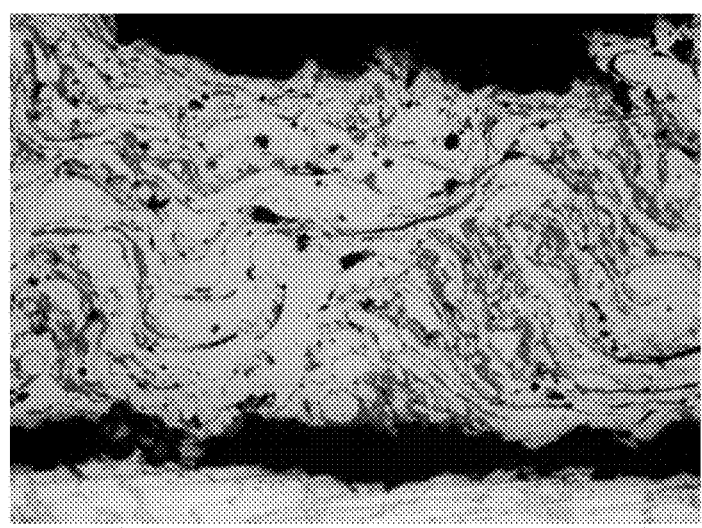
FIG. 4 is a view showing a sprayed coating layer formed by an arc spray.

FIG. 3 is a view showing the sprayed coating layer formed by the flame wire spray and FIG. 4 is a view showing the sprayed coating layer formed by an arc spray.

As shown in FIG. 3, the sprayed coating layer according to the present disclosure may be formed by the flame wire spray method. The reason is that the flame wire spray method is inexpensive as compared to the arc spray method or a plasma spray method, thereby reducing manufacturing costs, and in the case in which the iron (Fe) based sprayed coating layer is coated to have a thickness of 200 μm or more, a decrease in adhesion may occur by a difference in a coefficient of thermal expansion between the iron (Fe) based sprayed coating layer and the aluminum alloy, which is a base material. Therefore, the sprayed coating layer by the flame wire spray method has the lowest temperature of heat source and molten particles.

Meanwhile, in another form according to the plasma arc spray method, as shown in FIG. 4, particle speed of the molten particle is fast, thereby making it possible to overcome the coefficient of thermal expansion and secure adhesion. However, since the temperature of the heat source is high, disc thickness variation (DTV) and run out may cause defects of the disk. In addition, according to the arc spray method, since an area in which the molten particle is spread, that is, a fire point is wide, a micro-structure and an adhered state of the coating layer are less when compared to the flame wire spray method. Therefore, the sprayed coating layer according to one form of the present disclosure is formed by the flame wire spray method instead of the arc spray method.

In this case, the thickness of the Fe coating layer processed per each pass of a spray gun is 10 to 25 μm. The reason is that in the case in which the thickness of the Fe coating layer processed exceeds 25 μm/pass, residual stress in the sprayed coating layer may be increased, thereby decreasing adhesion, and in the case in which the thickness of the Fe coating layer is processed to be less than 10 μm/pass, a cycle time is increased, thereby increasing the manufacturing costs and decreasing productivity.

Here, the drum in hat brake disk is mounted in a rotatable jig to be rotated at a predetermined speed, and the spray gun forms the sprayed coating layer by performing a reciprocating motion in a vertical direction of the drum in hat brake disk at the predetermined speed while maintaining a predetermined angle with the inner diameter part 210.

The manufacturing method of a drum in hat brake disk according to one form of the present disclosure may further include, after the spray coating operation, a sprayed coating layer polishing operation in order to satisfy the thickness and surface roughness of the sprayed coating layer required from a final product.

In one form, the sprayed coating layer is polished to have the thickness of the sprayed coating layer of 100 to 150 μm, and the surface roughness Ra thereof of 0.8 to 1.8 μm.

The reason is that in the case in which the thickness of the sprayed coating layer is less than 100 μm, an exchanging period of the sprayed coating layer is reduced due to abrasion of the thin sprayed coating layer, in the case in which the thickness of the sprayed coating layer exceeds 150 μm, the manufacturing costs are increased while wear resistance is not significantly improved. In the case in which the surface roughness of the sprayed coating layer is less than 0.8 μm, a frictional coefficient is not sufficiently secured, thereby reducing braking force of the vehicle, and in the case in which the surface roughness of the sprayed coating layer is 1.8 μm or more, abrasion of a friction material may be accelerated.

The drum in hat brake disk according to one form of the present disclosure includes the main braking part 100 and the hat part 200. In this case, the iron (Fe) based sprayed coating layer is formed on the inner diameter part 210 of the hat part 200.

In this case, the hat part 200 is preferably formed of an aluminum (Al) alloy material having improved corrosion resistance and heat resistance. Thus, the vehicle, particularly, unsprung mass, or the like is lightened, thereby making it possible to improve riding quality and fuel efficiency.

Meanwhile, the lower wear resistance of the aluminum alloy is increased by forming the sprayed coating layer, thereby making it possible to lighten the vehicle while maintaining brake performance.

According to the present disclosure, the sprayed coating layer is formed of iron (Fe), but is not limited thereto. For example, various metals having superior wear resistance, heat resistance, and vibration and absorptivity may be selectively used.

In addition, it is possible to satisfy hardness $H_v$ of the sprayed coating layer of 300 to 400. The reason is that in the case in which the hardness of the sprayed coating layer exceeds 400, as aggression to another part is increased, which may cause over-abrasion of the frictional material such as the lining, and noise, and in the case in which the hardness of the sprayed coating layer is less than 300, an abrasion amount of the sprayed coating layer is increased. Therefore, the hardness $H_v$ of the sprayed coating layer may be between 300 to 400.

As set forth above, according to the forms of the present disclosure, the hat part is replaced with an aluminum alloy having the sprayed coating layer from a conventional gray cast iron, such that the vehicle may be lightened, thereby making it possible to improve the riding quality, the manipulability, and the fuel efficiency of the vehicle.

In addition, the sprayed coating layer is formed in the inner diameter part of the hat part, thereby making it possible to improve durability and braking capability.

Forms described may be changed or modified by those skilled in the art to which the present disclosure pertains without departing from the scope of the present disclosure, and various alterations and modifications are possible within the technical spirit of the present disclosure and the equivalent scope of the claims which will be described below.

What is claimed is:

1. A manufacturing method of a drum in hat brake disk, the manufacturing method comprising:
    casting cast iron to prepare a main braking part;
    seating the main braking part in a mold and injecting an aluminum alloy melt into the mold to form a hat part;
    cooling the main braking part and the hat part at room temperature and separating the mold to manufacture the drum in hat (DIH) brake disk;
    polishing a surface of an inner diameter part of the hat part in order to improve adhesion of a sprayed coating layer;
    performing a short blast process for the surface of the inner diameter part of the hat part using alumina; and
    forming the sprayed coating layer on the inner diameter part of the hat part which is subjected to the short blast process,
    wherein the forming of the sprayed coating layer is formed at a speed of 10 to 25 μm/pass, and the sprayed coating layer contains carbon (C) of 0.44 to 0.51 wt %, silicon (Si) of 0.15 to 0.35 wt %, manganese (Mn) of 0.60 to 0.90 wt %, phosphorus (P) of 0.04 wt % or less, but greater than 0 wt %, sulfur (S) of 0.04 wt % or less, a remainder iron (Fe), and incidental impurities, and
    wherein the aluminum alloy melt contains silicon (Si) of 11 to 13 wt %, copper (Cu) of 3 to 5 wt %, nickel (Ni) of 2 to 4 wt %, a remainder aluminum (Al), and incidental impurities.

2. The manufacturing method of claim 1, further comprising, pre-heating the main braking part to 400 to 500° C. so that flowability and filling property of the aluminum alloy melt are improved.

3. The manufacturing method of claim 1, wherein in the polishing of the inner diameter part of the hat part is grinded to have surface roughness Ra of 1.0 to 2.0 μm.

4. The manufacturing method of claim 1, wherein in the short blast process of the inner diameter part of the hat part is performed until the inner diameter part has a surface roughness Ra of 5.0 to 8.0 μm.

5. The manufacturing method of claim 1, wherein the forming of the sprayed coating layer is formed of a high carbon steel wire rod (SWRH) iron (Fe) wire using a flame wire spray method.

6. The manufacturing method of claim 1, further comprising, a sprayed coating layer polishing operation of polishing the sprayed coating layer so that a thickness of the sprayed coating layer is 100 to 150 μm, and surface roughness of the sprayed coating layer is 0.8 to 1.8 μm.

7. A drum in hat (DIH) brake disk for a vehicle, the drum in hat (DIH) brake disk comprising:
    a main braking part made of a cast iron material; and
    a hat part coupled to the main braking part and having a sprayed coating layer formed on a frictional surface therein,
    wherein the hat part is formed of an aluminum alloy containing silicon (Si) of 11 to 13 wt %, copper (Cu) of 3 to 5 wt %, nickel (Ni) of 2 to 4 wt %, a remainder aluminum (Al), and incidental impurities, and
    wherein the sprayed coating layer contains carbon (C) of 0.44 to 0.51 wt %, silicon (Si) of 0.15 to 0.35 wt %, manganese (Mn) of 0.60 to 0.90 wt %, phosphorus (P) of 0.04 wt % or less, but greater than 0 wt %, sulfur (S) of 0.04 wt % or less, a remainder iron (Fe), and incidental impurities.

8. The drum in hat (DIH) brake disk of claim 7, wherein a thickness of the sprayed coating layer is 100 to 150 μm.

9. The drum in hat (DIH) brake disk of claim 7, wherein surface roughness of the sprayed coating layer is 0.8 to 1.8 µm.

10. The drum in hat (DIH) brake disk of claim 7, wherein the sprayed coating layer is a Fe based flame sprayed coating layer, and hardness Hv of the sprayed coating layer is 300 to 400.

11. The drum in hat (DIH) brake disk of claim 7, wherein tensile strength of the main braking part is at least 170 Mpa, and tensile strength of the hat part is at least 100 Mpa.

* * * * *